United States Patent
De La Rica Quesada et al.

(10) Patent No.: US 12,523,652 B2
(45) Date of Patent: Jan. 13, 2026

(54) PROCESS FOR STORING AND RELEASING PROTEIN-DECORATED NANOPARTICLES ON PAPER SUBSTRATES

(71) Applicants: UNIVERSITAT DE LES ILLES BALEARS, Palma de Mallorca (ES); FUNDACIÓ INSTITUT D'INVESTIGACIÓ SANITÀRIA ILLES BALEARS, Palma de Mallorca (ES)

(72) Inventors: Roberto De La Rica Quesada, Palma de Mallorca (ES); Francy Alejandra Alba Patiño, Palma de Mallorca (ES); Cristina Adrover Jaume, Palma de Mallorca (ES)

(73) Assignees: UNIVERSITAT DE LES ILLES BALEARS, Palma de Mallorca (ES); FUNDACIÓ INSTITUT D'INVESTIGACIÓ SANITÀRIA ILLES BALEARS, Palma de Mallorca (ES)

( * ) Notice: Subject to any disclaimer, the term of this patent is extended or adjusted under 35 U.S.C. 154(b) by 975 days.

(21) Appl. No.: 17/641,400

(22) PCT Filed: Sep. 8, 2020

(86) PCT No.: PCT/EP2020/075013
§ 371 (c)(1),
(2) Date: Mar. 8, 2022

(87) PCT Pub. No.: WO2021/048087
PCT Pub. Date: Mar. 18, 2021

(65) Prior Publication Data
US 2022/0299504 A1    Sep. 22, 2022

(30) Foreign Application Priority Data
Sep. 9, 2019 (ES) .............................. ES201930784

(51) Int. Cl.
*G01N 33/543* (2006.01)
*G01N 33/52* (2006.01)
(Continued)

(52) U.S. Cl.
CPC ....... *G01N 33/54346* (2013.01); *G01N 33/52* (2013.01); *G01N 33/531* (2013.01);
(Continued)

(58) Field of Classification Search
CPC ............. G01N 33/54346; G01N 33/52; G01N 33/531; G01N 33/54306; G01N 33/54393;
(Continued)

(56) References Cited

U.S. PATENT DOCUMENTS

2018/0264144 A1  9/2018  De la Zerda et al.
2019/0118175 A1  4/2019  Kim et al.

FOREIGN PATENT DOCUMENTS

| CN | 105954251 A | 9/2016 |
| CN | 108755243 A | 11/2018 |
| WO | WO 2013185167 A1 | 12/2013 |

OTHER PUBLICATIONS

Cho, Hui Hun, et al. "A paper-based platform for long-term deposition of nanoparticles with exceptional redispersibility, stability, and functionality." Particle & Particle Systems Characterization 36.6 (2019): 1800483. (Year: 2019).*
(Continued)

*Primary Examiner* — Bao-Thuy L Nguyen
*Assistant Examiner* — Christopher Evans
(74) *Attorney, Agent, or Firm* — Seed Intellectual Property Law Group LLP (57) ABSTRACT

The invention relates to a process for storing protein-decorated nanoparticles on paper substrates without irreversible binding, and particularly for storing protein-deco-
(Continued)

rated nanoparticles within paper substrates modified with a polymer. The invention also relates to a reservoir containing protein-decorated nanoparticle capable of stablishing biological interactions obtained by the process and its use in biosensors made of paper.

23 Claims, 10 Drawing Sheets (51) Int. Cl.
G01N 33/531 (2006.01)
G01N 33/544 (2006.01)
G01N 33/548 (2006.01)
(52) U.S. Cl.
CPC . G01N 33/54306 (2013.01); G01N 33/54393 (2013.01); G01N 33/544 (2013.01); G01N 33/548 (2013.01)
(58) Field of Classification Search
CPC ...... B01L 3/00; B01L 2300/126; B82Y 30/00; D21H 17/35
See application file for complete search history.

(56) References Cited

OTHER PUBLICATIONS

Ruivo, Sónia, Ana M. Azevedo, and Duarte MF Prazeres. "Colorimetric detection of D-dimer in a paper-based immunodetection device." Analytical Biochemistry 538 (2017): 5-12. (Year: 2017).*
Zhao, Weian, et al. "based bioassays using gold nanoparticle colorimetric probes." Analytical chemistry 80.22 (2008): 8431-8437. (Year: 2008).*
Gokoglan, Tugba Ceren, et al. "Paper based glucose biosensor using graphene modified with a conducting polymer and gold nanoparticles." Journal of the Electrochemical Society 164.6 (2017): G59. (Year: 2017).*
Ngo, Ying Hui, et al. "Paper surfaces functionalized by nanoparticles." Advances in colloid and interface science 163.1 (2011): 23-38. (Year: 2011).*
Alba-Patiño et al., "Nanoparticle Reservoirs for Paper-Only Immunosensors," ACS Sens. 5:147-153, 2020.
Basarir, "Fabrication of Gold Patterns via Multilayer Transfer Printing and Electroless Plating," ACS Appl. Mater. Interfaces 4:1324-1329, Jan. 25, 2012.
Cai et al., "Coating sulfonated polystyrene microspheres with highly dense gold nanoparticle shell for SERS application," Colloid Polym Sci 291:2023-2029, 2013.
Calabria et al., "Smartphone-based enzymatic biosensor for oral fluid L-lactate detection in one minute using confined multilayer paper reflectometry," Biosensors and Bioelectronics 94:124-130, 2017.
Catala et al., "Online SERS Quantification of Staphylococcus aureus and the Application to Diagnostics in Human Fluids," Adv. Mater. Technol. 1:1600163, 2016. (9 pages).
Chen et al., "Three-dimensional origami paper-based device for portable immunoassay applications," Lab Chip 19:598-607, 2019.
Chu et al., "Paper-based chemiluminescence immunodevice with temporal controls of reagent transport technique," Sensors and Actuators B 250:324-332, Apr. 2017.
De la Rica et al., "Enzyme-responsive nanoparticles for drug release and diagnostics," Advanced Drug Delivery Reviews 64:967-978, 2012.
Deraney et al., "Multiplexed, Patterned-Paper Immunoassay for Detection of Malaria and Dengue Fever," Anal. Chem. 88:6161-6165, May 17, 2016.
Ellairaja et al., "Novel Pyrimidine Tagged Silver Nanoparticle Based Fluorescent Immunoassay for the Detection of Pseudomonas aeruginosa," J. Agric. Food Chem. 65:1802-1812, 2017.
Khan et al., "Nano-gold assisted highly conducting and biocompatible bacterial cellulose-PEDOT:PSS films for biology-device interface applications," International Journal of Biological Macromolecules 107:865-873, 2018.
Liang et al., "An origami paper device for complete elimination of interferents in enzymatic electrochemical biosensors," Electrochemistry Communications 82:43-46, 2017.
Liu et al., "Aptamer-Based Origami Paper Analytical Device for Electrochemical Detection of Adenosine," Angew. Chem. Int. Ed. 51:6925-6928, 2012.
Liu et al., "Three-Dimensional Paper Microfluidic Devices Assembled Using the Principles of Origami," J. Am. Chem. Soc. 133:17564-17566, 2011.
McLintock et al., "Universal Surface-Enhanced Raman Tags: Individual Nanorods for Measurements from the Visible to the Infrared (514-1064 nm)," ACS Nano 8(8):8600-8609, 2014.
Reboud et al., "Paper-based microfluidics for DNA diagnostics of malaria in low resource undeserved rural communities," PNAS 116(11):4834-4842, Mar. 12, 2019.
Roig-Sanchez et al., "Nanocellulose films with multiple functional nanoparticles in confined spatial distribution," Nanoscale Horiz. 4:634-641, 2019.
Ruivo et al., "Colorimetric detection of D-dimer in a paper-based immunodetection device," Analytical Biochemistry 538:5-12, 2017.
Russell et al., "Augmented Reality for Real-Time Detection and Interpretation of Colorimetric Signals Generated by Paper-Based Biosensors," ACS Sens. 2:848-853, 2017.
Russell et al., "Paper transducers to detect plasmon variations in colorimetric nanoparticle biosensors," Sensors & Actuators: B. Chemical 270:327-332, May 2018.
Tenda et al., "Paper-Based Antibody Detection Devices Using Bioluminescent BRET-Switching Sensor Proteins," Angew. Chem. Int. Ed. 57:15369-15373, 2018.
Wang et al., "Simple and covalent fabrication of a paper device and its application in sensitive chemiluminescence immunoassay," Analyst 137:3821-3827, 2012.
Zhang et al., "Converting colour to length based on the coffee-ring effect for quantitative immunoassays using a ruler as readout," Lab Chip 18:271-275, 2018.
Jiahui et al., "Nano Biomedicine," East China University of Science and Technology Press, p. 116, Dec. 2011 [English Abstract included]. (4 pages).
Lv et al., "Engineering Vehicle Load Spectrum Test Method and Application," China University of Mining and Technology Press, p. 34, Feb. 2011 [English Abstract included]. (4 pages).

* cited by examiner

PROCESS FOR STORING AND RELEASING PROTEIN-DECORATED NANOPARTICLES ON PAPER SUBSTRATES

The invention relates to a process for storing protein-decorated nanoparticles on paper substrates without irreversible binding, and particularly for storing protein-decorated nanoparticles within paper substrates modified with a polymer. The invention also relates to a reservoir containing protein-decorated nanoparticles capable of stablishing biological interactions obtained by the process and its use in biosensors made of paper.

BACKGROUND ART

Filter paper is the substrate of choice for developing disposable biosensors due to its light weight, low price and easy disposal (Reboud et al. Paper-based microfluidics for DNA diagnostics of malaria in low resource underserved rural communities. Proc. Natl. Acad. Sci. USA 2019, 116, 4834-4842; Roig-Sanchez et al. Nanocellulose films with multiple functional nanoparticles in confined spatial distribution Nanoscale Horiz, 2019, 4, 634-641; Tenda et al., Paper-Based Antibody Detection Devices Using Bioluminescent BRET-Switching Sensor Proteins. Angew. Chemie—Int. Ed. 2018, 57, 15369-15373). It is commercially available in a wide array of pore sizes and can be easily modified with biomolecules following physical adsorption or covalent attachment methods (Chu et al. Paper-based chemiluminescence immunodevice with temporal controls of reagent transport technique. Sensors Actuators, B Chem. 2017, 250, 324-332; Wang et al. Simple and covalent fabrication of a paper device and its application in sensitive chemiluminescence immunoassay. Analyst 2012 137, 3821). Its porous matrix can also be used to store reagents such as enzymes and their substrates in order to fabricate reservoirs integrated into paper-based analytical devices (Calabria et al. Smartphone-based enzymatic biosensor for oral fluid L-lactate detection in one minute using confined multilayer paper reflectometry. Biosens. Bioelectron. 2017, 94, 124-130). Such reservoirs must preserve the physicochemical properties of the constituent reagents over time while also ensuring an efficient release of their contents to other paper areas upon addition of liquid. Plasmonic nanoparticles are extremely useful building blocks for the fabrication of biosensors using a wide array of signal transduction mechanisms, from colorimetry (Russell and de la Rica Paper transducers to detect plasmon variations in colorimetric nanoparticle biosensors. Sensors Actuators, B Chem. 2018, 270, 327-332) and surface-enhanced Raman spectroscopy (SERS) (Catala et al. Online SERS Quantification of *Staphylococcus aureus* and the Application to Diagnostics in Human Fluids Adv. Mater. Technol. 2016, 1600163) to fluorimetry (Ellairaja et al. Novel Pyrimidine Tagged Silver Nanoparticle Based Fluorescent Immunoassay for the Detection of *Pseudomonas aeruginosa*. J. Agric. Food Chem. 2017, 65, 1802-1812) and electrochemistry (Liang et al. An origami paper device for complete elimination of interferents in enzymatic electrochemical biosensors. Electrochem. Commun. 2017 82, 43-46).

However, nanoparticles tend to adsorb irreversibly to paper substrates after drying, which makes it difficult to store them in reservoirs made of this material (Ruivo et al. Colorimetric detection of D-dimer in a paper-based immunodetection device. Anal. Biochem. 2017, 538, 5-12). Traditionally this issue has been overcome by making reservoirs out of glass fiber rather than conventional paper (Deraney et al., Multiplexed, Patterned-Paper Immunoassay for Detection of Malaria and Dengue Fever. Anal. Chem. 2016, 88, 6161-6165). Yet, this approach is not fully compatible with biosensor designs such as origami paper-based analytical devices. These biosensors are meant to be entirely made of paper with the purpose of simplifying their fabrication and facilitating the contact between the parts without the use of additional adhesives (Liu et al. Aptamer-based origami paper analytical device for electrochemical detection of adenosine. Angew. Chemie—Int. Ed. 2012, 51, 6925-6928; Liu and Crooks, Three-dimensional paper microfluidic devices assembled using the principles of origami. J. Am. Chem. Soc. 2011, 133, 17564-17566).

PSS has been previously used in order to avoid nanoparticle flocculation, usually in the form of alternating layers of PSS and a positively charged polymer such as polydiallyldimethylammonium chloride (McLintock et al., Universal surface-enhanced Raman tags: Individual nanorods for measurements from the visible to the infrared (514-1064 nm). ACS Nano 2014, 8, 8600-8609). It has also been used as a support for growing nanoparticles (Cai et al., Coating sulfonated polystyrene microspheres with highly dense gold nanoparticle shell for SERS application. Colloid Polym. Sci. 2013, 291, 2023-2029), and for transferring them to a receiving substrate with soft lithography (Basarir, Fabrication of gold patterns via multilayer transfer printing and electroless plating. ACS Appl. Mater. Interfaces 2012, 4, 1324-1329). PSS blended with PEDOT is routinely used in order to modify cellulose and render it conductive (Khan et al., Nano-gold assisted highly conducting and biocompatible bacterial cellulose-PEDOT:PSS films for biology-device interface applications. Int. J. Biol. Macromol. 2018, 107, 865-873).

The release of nanoparticles stored in unmodified paper substrates has not been characterized in full (Chen et al. Three-dimensional origami paper-based device for portable immunoassay applications. Lab Chip 2019, 19, 598-607), and in some cases has been reported to be highly inefficient (Ruivo et al., 2017).

Therefore, it would be desirable to find a process for storing nanoparticles on paper substrates and releasing them with high efficiency on demand so that they could be implemented in 2D and 3D analytical devices made of paper.

SUMMARY OF THE INVENTION

A first aspect of the present invention relates to a process for obtaining a reservoir comprising protein-decorated nanoparticles on paper substrates which comprises the steps of:
i. treatment of a paper substrate with a hydrophilic negatively charged polymer over the paper substrate; and
ii. applying protein-decorated nanoparticles over the PSS-modified paper substrate obtained in step (i).

In another embodiment the invention relates to the process as defined above, wherein the polymer is polystyrene sulfonate (PSS).

In another embodiment the invention relates to the process as defined above, wherein the protein is a protein capable of stablishing biological interactions, preferably wherein the protein is avidin or an antibody.

In another embodiment the invention relates to the process as defined above, wherein the protein is a protein capable of stablishing biological interactions and the protein is avidin.

In another embodiment the invention relates to the process as defined above, wherein the protein is a protein capable of stablishing biological interactions and the protein is an antibody.

In another embodiment the invention relates to the process as defined above, wherein the nanoparticles are pegylated nanoparticles.

In another embodiment the invention relates to the process as defined above, wherein the pegylated nanoparticles are pegylated nanoparticles made of gold.

In another embodiment the invention relates to the process as defined above, wherein the treatment of step (i) is performed by spotting the polymer, and preferably PSS, over pieces of the paper substrate.

In another embodiment the invention relates to the process as defined above, wherein the pieces of the paper substrate of step (i) are cut in the form of squares.

In another embodiment the invention relates to the process as defined above, wherein the volume of added polymer, preferably of added PSS, is large enough to create a volume of polymer-modified paper that is larger than the volume that will be occupied by the pegylated nanoparticles.

In another embodiment the invention relates to the process as defined above, wherein the volume of added polymer, preferably of added PSS, is of 50 µL and the volume of pegylated nanoparticles, preferably pegylated nanoparticles made of gold, is of 1 µL.

In another embodiment the invention relates to the process as defined above, which further comprises the step (iii) of drying the paper after step (i), and preferably wherein the step (iii) of drying is performed at a temperature from 15° C. to 50° C.

In another embodiment the invention relates to the process as defined above, which further comprises the step (iv) of letting the paper dry after step (ii), and preferably wherein the step (iv) of drying is performed at a temperature from 15° C. to 25° C.

In another embodiment the invention relates to the process as defined above, which further comprises the step (v) of releasing the nanoparticles from the reservoir.

In another embodiment the invention relates to the process as defined above, wherein the releasing step (v) is a transferring step to a receiving substrate, and preferably to a wet receiving paper substrate or to a polypropylene receiving substrate.

In another embodiment the invention relates to the process as defined above, wherein the transferring step (v) is performed by pressing, preferably by pressing with a finger, a press or a clamp, and more preferably by pressing in the center of the spot for at least 4 minutes.

The transfer of nanoparticles to the reservoir can be adjusted to happen preferentially at the edges or homogenously throughout the reservoir by fine-tuning the % of PSS and the concentration of nanoparticles, for example, when the % PSS is comprised between 1.9 and 7.5% and the concentration of nanoparticles is 72 nM then transfer from the edges is favored, and when the % PSS is 30% and the concentration of nanoparticles is 210 nM or higher a homogenous transfer of nanoparticles to the receiving substrates is obtained.

Thus, in another embodiment the invention relates to the process as defined above, wherein the transferring step (v) is adjusted by fine-tuning the PSS content and the concentration of nanoparticles, preferably pegylated nanoparticles or pegylated nanoparticles made of gold.

In another embodiment the invention relates to the process as defined above, wherein the transferring step (v) is adjusted by fine-tuning the PSS content between 1.9 and 7.5% and at a concentration of pegylated nanoparticles made of gold of 72 nM.

In another embodiment the invention relates to the process as defined above, wherein the transferring step (v) is adjusted by fine-tuning the PSS content to 30% and at a concentration of pegylated nanoparticles made of gold of at least 210 nM.

In another embodiment the invention relates to the process as defined above, wherein the receiving paper substrate of step (v) has been modified with a biological ligand, preferably bovine serum albumin (BSA) modified with biotin and saturated with phosphate buffered saline with Tween-20 (PBST), that interacts specifically with a receptor protein, preferably with avidin, bound to the nanoparticles.

In another embodiment the invention relates to the process as defined above, wherein the protein, preferably avidin or an antibody, bound to the nanoparticles stablishes biological interactions with a target, preferably biotin or antigens, bound to the receiving substrate, preferably to the wet paper substrate or to the polypropylene substrate, in step (v).

In another embodiment the invention relates to the process as defined above, which further comprises a step (vi) of removing the reservoir after performing step (v) and removing excess reagents, and preferably wherein step (vi) is performed by washing from 3 to 5 times with PBST.

A second aspect of the present invention relates to a reservoir comprising protein-decorated nanoparticles on paper substrates obtained by the process defined above.

A third aspect of the present invention relates to the use of the protein-decorated nanoparticle reservoir as defined above in the preparation of biosensors made of paper.

Figure 1:
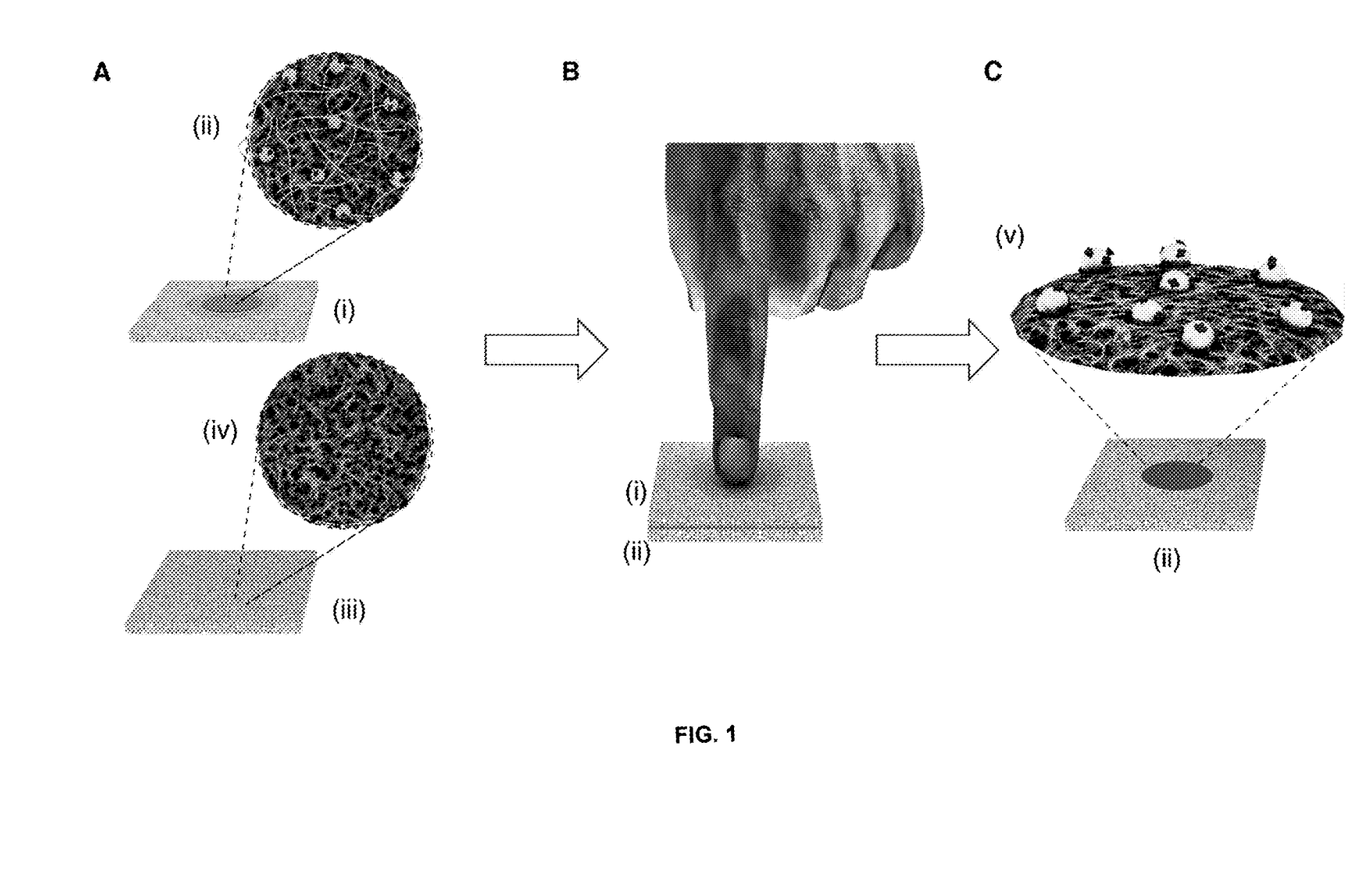
FIG. 1. Schematic representation of the nanoparticle reservoir and the procedure to transfer its contents to a receiving paper substrate; (A) The paper reservoir (i) contains polystyrene sulfonate (PSS) and gold nanoparticles decorated with proteins; the receiving substrate (ii) contains physically adsorbed ligands; (B) Placing the dry reservoir (i) on the wet receiving substrate (ii) and pressing, for example with a finger transfers the nanoparticles from the former to latter; (C) After washing away excess reagents the nanoparticles remain bound to the receiving substrate (ii) by means of biospecific interactions (v)

Present invention introduces a new approach for fabricating nanoparticle reservoirs on filter paper. It consists of modifying the paper substrates with the negatively charged polymer polystyrene sulfonate (PSS) in order to avoid the irreversible binding of PEGylated nanoparticles to the cellulose matrix (FIG. 1A). Reservoirs prepared this way can release nanoparticles with high efficiency.

According to the invention, PSS is useful to avoid the irreversible binding of nanoparticles to cellulose matrices. Besides enabling the release of nanoparticles from cellulose matrices on demand, PSS also makes it possible to transfer nanoparticles from the dry reservoir to a receiving wet paper substrate by simply pressing the former against the latter (FIG. 1B). This makes the proposed reservoirs useful for developing biosensors with simplified liquid handling schemes, since there is no need to add a controlled volume of buffer to the reservoir in order to transfer its contents to a detection area. Furthermore, nanoparticles modified with a protein (avidin, antibodies) retain their ability to specifically recognize their target (biotin, antigens) immobilized on the receiving piece of paper in a dose-dependent manner, which demonstrates the suitability of that approach for developing biosensors (FIG. 1C).

Here a process has been introduced for storing protein-decorated nanoparticles on paper substrates that also allows to release them on demand. It consists of spotting nanoparticles onto pieces of filter paper previously modified with polystyrene sulfonate (PSS). Gold nanoparticles modified with avidin can be easily transferred from the dry reservoir to a receiving wet piece of paper by simply pressing with the finger. Furthermore, the nanoprobes can establish biospecific avidin-biotin interactions with substrate-bound molecules, which makes the reservoirs suitable for fabricating nanoparticle-based biosensors. Adjusting the % PSS and nanoparticle concentration in the reservoirs enables a homogenous transfer between paper layers without the formation of "coffee rings". These features make the process of the invention ideal for developing origami biosensors made of filter paper and incorporating signal generation mechanisms based on nanoprobes.

The reservoirs proposed by this invention are easy to fabricate, have a long shelf life and avoid common pitfalls associated to paper biosensors such as the generation of patchy colorimetric signals. These features make them ideal for the fabrication of biosensors made of paper.

In summary, present invention describes a process to store nanoparticles modified with PEG and proteins in filter paper when the filter paper is previously treated with PSS. This treatment with PSS avoids irreversible interactions with the paper, which enables a complete release of nanoparticles upon addition of an aqueous solution. It also enables transferring the nanoparticles from the reservoir to a receiving substrate by pressing one paper sheet against the other with the finger. Fine-tuning the % PSS avoids the formation of "coffee rings" in both the reservoir and the receiving substrate. This leads to homogenously distributed colorimetric signals resulting from biomolecular interactions between the nanoprobes and substrate-bound molecules. The presence of PSS in the reservoir does not interfere with the generation of avidin-biotin or antibody-antigen interactions, and preserves the nanoprobes for at least one month. These features make the proposed reservoirs ideal for the fabrication of paper-only biosensors incorporating biomolecule-decorated nanoprobes.

Throughout present invention the term "hydrophilic negatively charged polymer" refers to polymers that establish thermodynamically favorable interactions with water and that contain groups that can be deprotonated to yield negatively charged moieties. Examples include, among others, polystyrene sulfonate (PSS), polyglutamic acid and nucleic acids.

"A protein capable of stablishing biological interactions" refers to a protein that interacts with another molecule by means of specific biomolecular interactions. Examples include, among others, avidin-biotin interactions, streptavidin-biotin interactions, antibody-antigen interactions, agonist-receptor interactions, enzyme-substrate interactions and enzyme-inhibitor interactions.

"Pegylated nanoparticles" refers to nanoparticles modified with polyethylene glycol (PEG). Examples include, among others, metallic or metal oxide nanoparticles modified with PEG (gold, silver, platinum, iron oxide or zinc oxide, among others), semiconductor nanoparticles modified with PEG (for example, quantum dots and upconversion nanoparticles, among others), liposomes and protein nanoparticles modified with a PEG shell, and polymer nanoparticles containing PEG on their outer layer.

The term "receiving substrate" refers to any solid material to which nanoparticles can be transferred. The term includes, among others, "wet receiving paper substrates" which refers to a piece of paper humidified with an aqueous solution and "polypropylene receiving substrate". Examples include, among others, filter paper with different pore sizes, bacterial cellulose, nitrocellulose, propylene face masks, textiles such as cotton or polyester, skin, animal tissues, metals, silicon wafers, elastomers and hydrogels.

Unless otherwise defined, all technical and scientific terms used herein have the same meaning as commonly understood by one of ordinary skilled in the art to which this invention belongs. Methods and materials similar or equivalent to those described herein can be used in the practice of the present invention. Throughout the description and claims the word "comprise" and its variations are not intended to exclude other technical features, additives, components, or steps. Additional objects, advantages and features of the invention will become apparent to those skilled in the art upon examination of the description or may be learned by practice of the invention. The following examples and drawings are provided by way of illustration and are not intended to be limiting of the present invention.

Unless otherwise defined, all technical and scientific terms used herein have the same meaning as commonly understood by one of ordinary skilled in the art to which this invention belongs. Methods and materials similar or equivalent to those described herein can be used in the practice of the present invention. Throughout the description and claims the word "comprise" and its variations are not intended to exclude other technical features, additives, components, or steps. Additional objects, advantages and features of the invention will become apparent to those skilled in the art upon examination of the description or may be learned by practice of the invention. The following examples and drawings are provided by way of illustration and are not intended to be limiting of the present invention.

EXAMPLES

Synthesis and modification of gold nanoparticles with polyethylene glycol and avidin: Citrate-capped gold nanoparticles with a diameter of ca. 40 nm were synthesized with the Turkevich method as previously described (Russell et al., Augmented Reality for Real-Time Detection and Interpretation of Colorimetric Signals Generated by Paper-Based Biosensors. ACS Sensors 2017, 2, 848-853). The nanoparticles were then modified with 0.1 mM thiolated polyethylene glycol (PEG) molecules ending in carboxylate moieties (poly(ethylene glycol) 2-mercaptoethyl ether acetic acid, Mn 2100, Sigma) overnight. The resulting PEGylated nanoparticles were concentrated and washed with water 5 times via centrifugation at 8000 rpm for 6 min. The nanoparticles were finally suspended in 0.5 M 2-(N-morpholino)ethanesulfonic acid (MES, Sigma) adjusted at pH 5.5. Carboxylate moieties around the nanoparticles were then transformed into sulfo-NHS esters by adding 1 mg of N-(3-dimethylaminopropyl)-N'-ethylcarbodiimide hydrochloride (EDC, Sigma) and 2 mg of N-hydroxysulfosuccinimide sodium salt (sulfo-NHS, Sigma) for 20 min. Then the nanoparticles were pelleted by centrifugation and the supernatant was substituted for a solution containing 1 mg·mL$^{-1}$ avidin in 0.1 M phosphate buffer pH 7.4. After 1 h, unreacted sulfo-NHS esters were capped with 0.1 M glycine and 10 mg·mL$^{-1}$ bovine serum albumin (BSA) for 30 min. The nanoparticles were then washed 5 times with phosphate buffer saline (PBS) containing 0.1% Tween-20 (PBST). The resulting avidin-covered nanoparticles were kept at 4° C. until used. Antibody-modified nanoparticles were obtained by incubating biotinylated antibodies with the avidin-covered nanoparticles for 1 h followed by washing away the excess reagents via 3 centrifugation steps.

Densitometry. Gold nanoparticles on paper substrates generate concentration-dependent colorimetric signals that can be evaluated with densitometry as follows. First the paper substrates were scanned with an MFC-1910W scanner-printer (Brother). Pixel intensity (PI) profiles were obtained with ImageJ. In grayscale pure white yields a 255 pixel intensity whereas pure black yields a 0 pixel intensity. The colorimetric signal S was obtained as follow. First the pixel intensity in grayscale was measured in a circular area within the area of interest with the Histogram function of ImageJ. The colorimetric signal S was taken as the integer value after subtracting the background signal. Please note that subtracting the background pixel intensity yields inverted signals compared to the raw data.

Fabrication of nanoparticle reservoirs: Whatman filter paper number 41, 1 and 6 (pore diameter of 20-25, 11, and 3 µm, respectively) was used. The paper was cut in squares and modified with 50 µL of polystyrene sulfonate (PSS, 30%, Sigma) diluted to different % (v/v) with water when required. After drying, 1 µL of PEGylated gold nanoparticles modified with avidin was added and let dry at room temperature. To study the release of nanoparticles from reservoirs, the nanoparticle-modified dry paper substrates were positioned on top of a folded piece of filter paper and 1 mL of PBST was added 3 times. The presence of nanoparticles after this step was evaluated by letting the paper dry and measuring any changes in the color of the nanoparticle reservoir with densitometry.

Nanoparticle transfer and biorecognition: the transfer of nanoparticles from the reservoir to a receiving paper substrate was studied with the following procedure. Receiving paper substrates were modified with 2 µL of biotinylated BSA (100 µg·mL$^{-1}$ in PBS) or antigens at different concentrations stated in FIG. 8. Biotinylated BSA was obtained with an EZ-Link™ sulfo-NHS-biotinylation kit (Thermo Scientific). Control experiments with non-biotinylated BSA were performed in order to assess the contribution of non-specific interactions to the colorimetric signal. After drying, 1 mL of PBS supplemented with 5 mg·mL$^{-1}$ BSA (PBS-BSA) was added. Then the reservoir was placed on top of the wet receiving paper and nanoparticle transfer was facilitated by pressing in the center of the spot for 4 min. Subsequently the reservoir was removed, and the receiving substrate was washed 3 times with PBST in order to remove non-specific interactions. After drying, the colorimetric signal was evaluated with densitometry as detailed above.

Figure 2:
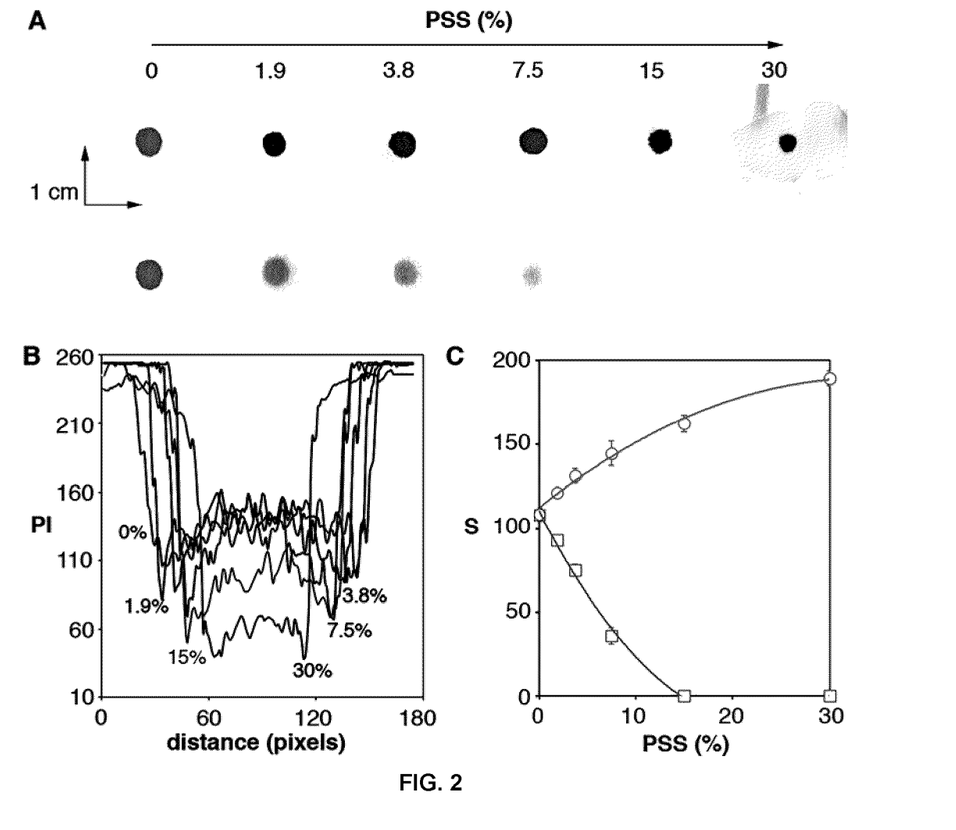
FIG. 2. Fabrication of nanoparticle reservoirs with different % PSS; (A) Scanned images of the reservoirs before (top row) and after (bottom row) washing 3 times with 1 mL PBST; (B) Pixel intensity (PI) profiles across the reservoirs; (C) Colorimetric signal (S) in the reservoir before (circles) and after (squares) washing 3 times with PBST. Error bars are the standard deviation (n=3). Trend lines are a guide to the eye.

The modification of paper substrates with PSS facilitates storing nanoparticles in the cellulose matrix while at the same time enabling their release with a high efficiency. To study this, filter paper was cut in squares and then 50 µL of PSS at different dilutions was added and let dry. Paper substrates with a pore size of 22 µm (Whatman #41) remained mostly flat at all PSS concentrations, and therefore were subsequently used for the fabrication of nanoparticle reservoirs. These were obtained by pipetting 1 µL of gold nanoparticles in the center of the PSS-modified paper and letting it dry at room temperature. The most widely available gold nanoparticle suspensions are synthesized following the Turkevich method, which renders them capped with negatively charged citrate molecules. To avoid nanoparticle aggregation in solutions containing highly concentrated cations or proteins, citrate molecules are often substituted for thiolated polyethylene glycol molecules (de la Rica et al., Enzyme-responsive nanoparticles for drug release and diagnostics. Adv. Drug Deliv. Rev. 2012, 64, 967-978). This not only prevents nanoparticle aggregation but also enables introducing reactive groups such as carboxylate moieties for further covalent attachment with biomolecules. With this in mind, the fabrication of reservoirs containing PEGylated nanoparticle probes modified with avidin via amide bond formation has been studied. FIG. 2A (top row) shows pictures of nanoparticle reservoirs prepared with different % PSS and 72 nM gold nanoparticles modified with avidin. In these images, the spot diameter tends to decrease as the % PSS in the paper increases. Concomitantly, the color intensity increases as the % PSS increases. This can also be observed in the pixel intensity profiles obtained from these images in FIG. 2B. In grayscale, the pixel intensity is the highest when the color is white (255) and the lowest when the color is black (0). In FIG. 2B the pixel intensity across the reservoir decreases as the % PSS increases. The spot diameter follows the same trend. This indicates that the nanoparticles are found at higher concentrations and within a smaller volume of the paper matrix as the % PSS increases. Accordingly, the formation of these smaller and more concentrated nanoparticle reservoirs is related to a slower diffusion of the nanoparticles within the cellulose matrix. It is well established that the viscosity of a solution increases as the concentration of PSS increases (Boris and Colby, Rheology of sulfonated polystyrene solutions. Macromolecules 1998, 31, 5746-5755). Since the diffusion coefficient is inversely proportional to the viscosity according to the Stokes-Einstein equation, highly concentrated PSS reduces radial diffusion and results in smaller spots containing nanoparticles at a higher concentration. Please note that, although PSS gives a yellowish color to the paper substrate, its contribution to the pixel intensity cannot fully account for the changes in color observed within the reservoir. For example, in FIG. 2B the pixel intensity outside the nanoparticle area decreases from 254 to 234 due to the modification with 30% PSS, but it decreases much more in the center of the reservoir, where the nanoparticles are found (PI 62). This means that the main contribution to the observed changes in color is a higher concentration of nanoparticles in the reservoir and not the addition of PSS. In FIG. 2B, it is also noticeable that the pixel intensity is lower at the edge of the reservoir than in the center. This is attributed to a higher concentration of nanoparticles at the edge of the spots due to an uneven distribution of solutes during the drying procedure (the so-called "coffee-ring effect") (Zhang et al. Converting color to length based on the coffee-ring effect for quantitative immunoassays using a ruler as readout. Lab Chip 2018, 18, 271-275). Finally, it has been determined whether the nanoparticles could be released efficiently from the reservoir, which is an important requirement for integrating reservoirs in biosensors. To this end, 1 mL of PBST was added 3 times to the reservoirs. In FIG. 2A (bottom row) the color does not change in the absence of PSS, showing that without the polymer the nanoparticles are irreversibly bound to the cellulose matrix. However, as the % PSS increases the color within the spot progressively disappears, which indicates that the nanoparticles exit the reservoir more efficiently when the % PSS in the reservoir is higher. These experiments demonstrate that PSS prevents the formation of irreversible interactions between the nanoparticles and the paper matrix. In FIG. 2C signal quantification with densitometry shows that no color remains in the reservoir when the % PSS utilized to fabricate the reservoir is 15% or higher, which suggests a complete release of avidin-modified nanoparticles under this condition. All in all, the results shown in FIG. 2 demonstrate that it is possible to store PEGylated nanoparticles modified with proteins in a dry piece of paper previously modified with PSS, and that the nanoparticles can be released on demand by simply adding an aqueous solution.

Figure 3:
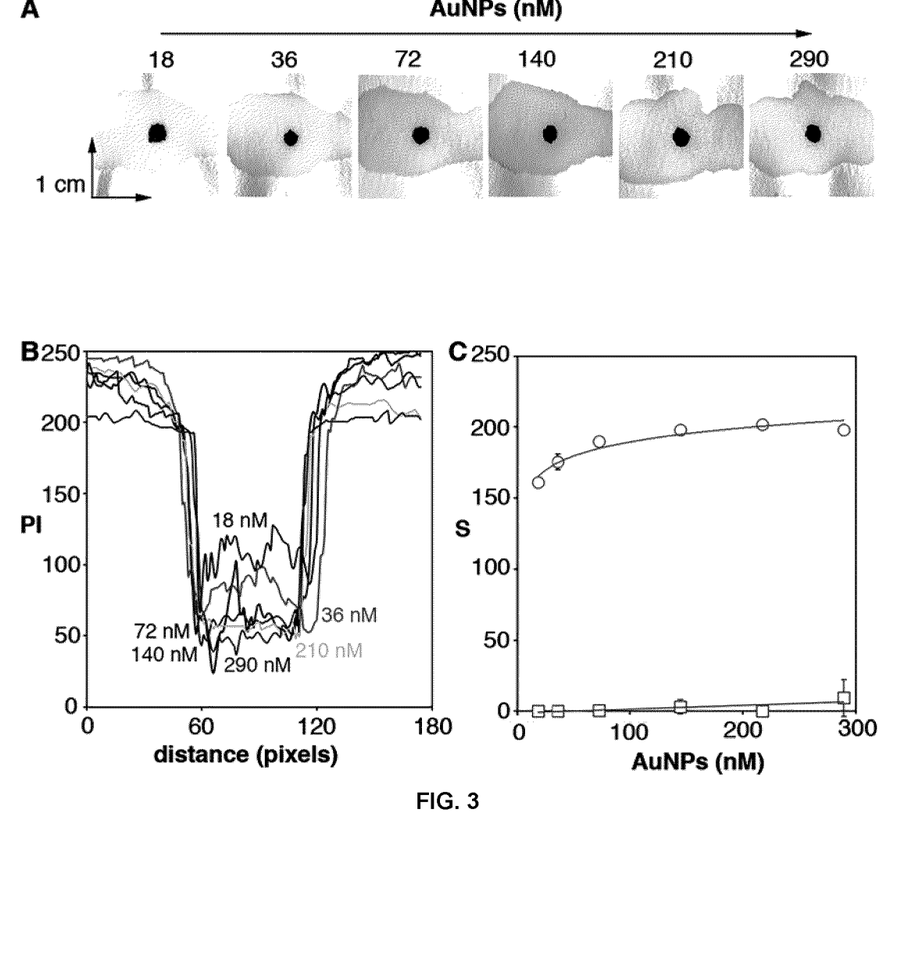
FIG. 3. Fabrication of reservoirs with 30% PSS and avidin-decorated nanoparticles at different concentrations; (A) Scanned images of the reservoirs before (top row) and after (bottom row) washing 3 times with 1 mL PBST; (B) Pixel intensity (PI) profiles across the reservoirs; (C) Colorimetric signal (S) in the reservoir before (circles) and after (squares) washing 3 times with PBST. Error bars are the standard deviation (n=3). Trend lines are a guide to the eye.

Next, it has been demonstrated that the nanoparticle concentration has an impact on the fabrication of a paper-based reservoir containing avidin-modified gold nanoparticles. To this end, 1 µL of nanoparticles at different concentrations were pipetted onto paper substrates modified with 30% PSS (FIG. 3A). Profile analysis reveals that the formation of a "coffee ring" in the reservoir observed in FIG. 2 can be prevented when nanoparticles are dispensed with a concentration of 140 nM or higher, since the pixel intensity is the same in the center and at the edge of the spot (FIG. 3B). To study the effect of nanoparticle concentration in the release of contents from the PSS-modified cellulose matrix, the reservoirs were washed with PBST as above and the remaining colorimetric signal was measured with densitometry. In FIG. 3A, low row and FIG. 3C, the remaining colorimetric signal is very low at all the concentration assayed. Only a slight increase in color can be detected at the highest assayed concentration of nanoparticles. This indicates that 30% PSS is effective at preventing irreversible interactions with the paper even when the reservoirs contain a high concentration of gold nanoparticles. In summary, experiments in FIG. 3 indicate that the best fabrication parameters for obtaining reservoirs with the proposed method are 30% PSS and gold nanoparticles with a concentration of 140-210 nM. Under these conditions that nanoparticles within the reservoir are evenly distributed (i.e. there is no coffee ring) and there is a complete release of colloids from the reservoir (no color remains in the paper reservoir).

Figure 4:
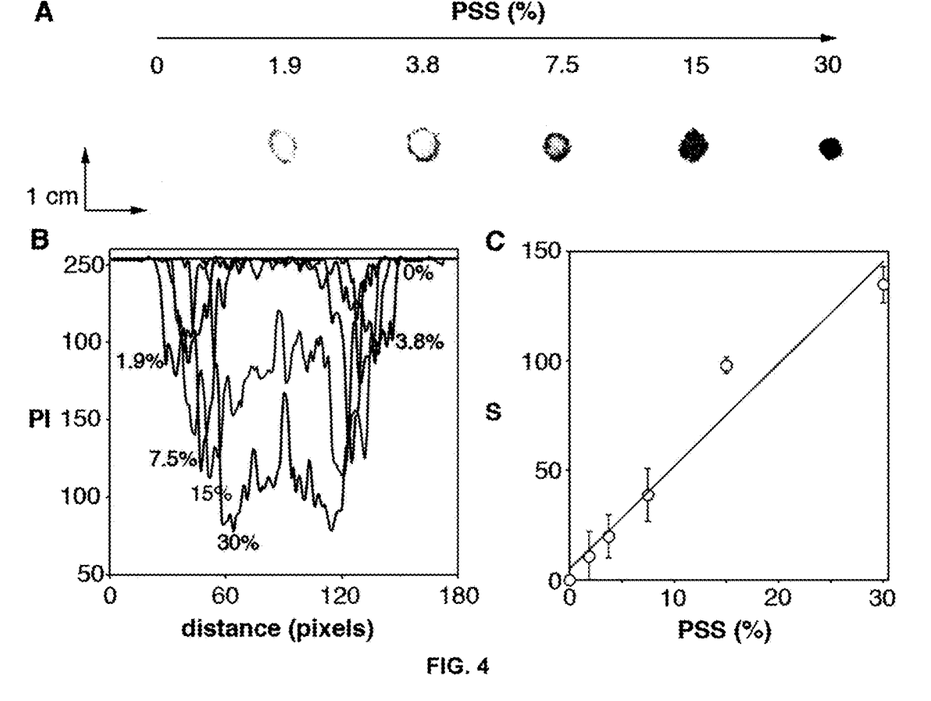
FIG. 4. Transfer of avidin-decorated nanoparticles from the reservoirs with different % PSS to receiving substrates modified with biotinylated proteins; (A) Scanned images of the receiving substrates after pressing the reservoirs for 4 minutes, removing them and washing 3 times with 1 mL PBST; (B) Pixel intensity (PI) profiles across the receiving substrate; (C) Colorimetric signal (S) in the receiving paper substrate. Error bars are the standard deviation (n=3). Trend lines are a guide to the eye.
Figure 5:
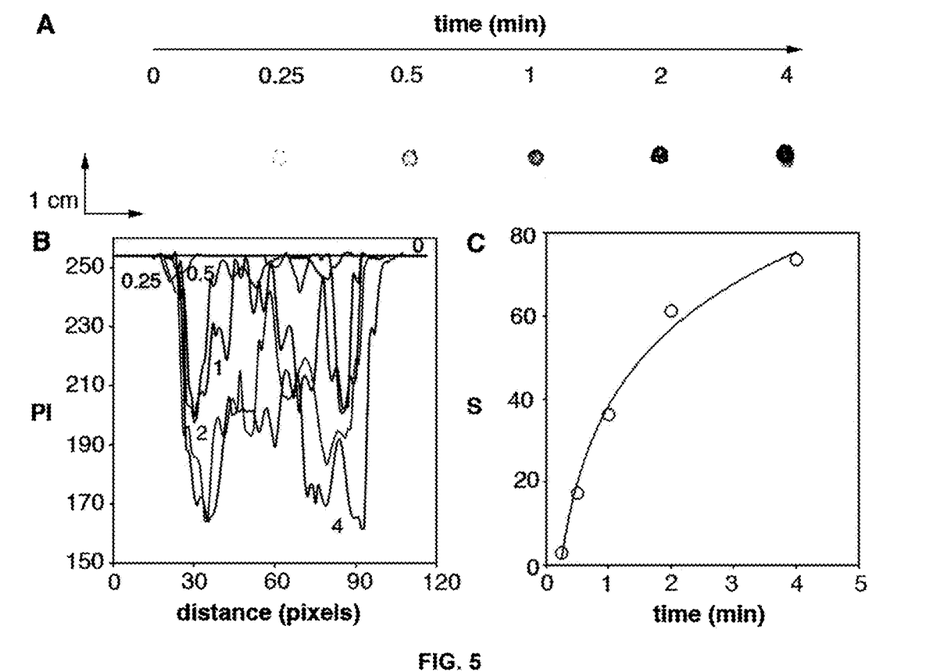
FIG. 5. Time-dependent transfer of avidin-decorated nanoparticles from reservoirs containing 30% PSS to receiving substrates modified with biotinylated proteins; (A) Scanned images of the receiving substrates after pressing the reservoirs for different times; (B) Pixel intensity (PI) profiles across the receiving substrate; (C) Colorimetric signal (S) in the receiving paper substrate. Trend lines are a guide to the eye.

After studying the best conditions for storing and releasing nanoparticles in cellulose, the ability of transferring the colloids in the dry reservoir to a receiving wet paper by pressing the former onto the latter was tested (FIG. 1B). Simultaneously, it was tested whether the avidin around the nanoparticles was still able to bind biotinylated molecules in the receiving substrate. In other words, it has been studied whether the presence of PSS interfered with the invention model biological interaction. To carry out this investigation, the dry reservoirs were pressed against a receiving paper substrate modified with biotinylated BSA and saturated with PBST. This transferred liquid from the wet receiving paper to the dry paper reservoir. The resulting rehydration of the reservoir allowed the nanoparticles to be transferred from the reservoir to the receiving substrate. After peeling off the reservoir, the presence of nanoparticles bound to the receiving paper substrate through avidin-biotin interactions was evaluated after washing it 3 times with PBST. FIG. 4A shows images of the receiving substrate when the reservoir was made with the same concentration of nanoparticles (72 nM) and different % PSS. In these images, the color in the spot is more homogenously distributed and intense as the % PSS increases. Indeed, at low % PSS only a nanoparticle ring is generated, which progressively fills up to yield a colored spot at high % PSS. FIG. 4B also shows that avidin-decorated nanoparticles tend to accumulate in the periphery of the receiving spot when the concentration of PSS is low. As the % PSS increases, the diameter of the nanoparticle ring decreases and more nanoparticles are observed in the center of the spot. In FIG. 4C the colorimetric signal increases as the % PSS increases because more nanoparticles are transferred within the region of interest. It has been proposed that there could be two mechanisms for nanoparticle transfer that could result in the formation of a ring. The first mechanism implies that at a low % PSS nanoparticles diffuse radially and accumulate at the edges upon being transferred whereas at high % PSS the nanoparticles diffuse radially to a lesser extent and are transferred homogenously to the receiving paper. This would result in more concentrated nanoparticles in the center of the spot as the % PSS increases, in agreement with the observations in FIG. 4. In the second hypothesis, nanoparticles are transferred preferentially from the edges of the reservoir to the receiving paper substrate. That is, a ring is firstly generated which subsequently fills up with more nanoparticles. To discern which mechanism governs nanoparticle transfer from the reservoir to the receiving paper, the same experiments where repeated with reservoirs made with the highest concentration of PSS (30%), but with different contact time between paper layers. In FIGS. 5A and B the nanoparticles are transferred as a ring when short transfer times are applied even when the % PSS is high. In FIG. 5C the colorimetric signal increases as the time increases. These results invalidate the first mechanism, since no nanoparticles are observed in the center of the reservoir during the first stages of the nanoparticle process. Therefore, it has been proposed that nanoparticles and PSS are preferentially transferred from the edges of the reservoir. This generates a diffusion barrier that results in the subsequent transfer of polymer and nanomaterials in the central area of the receiving paper, in agreement with the second hypothesis proposed above. Below it has been shown that the nanoparticle concentration and paper type have an impact on the generation of specific and non-specific signals for biosensing applications.

Figure 6:
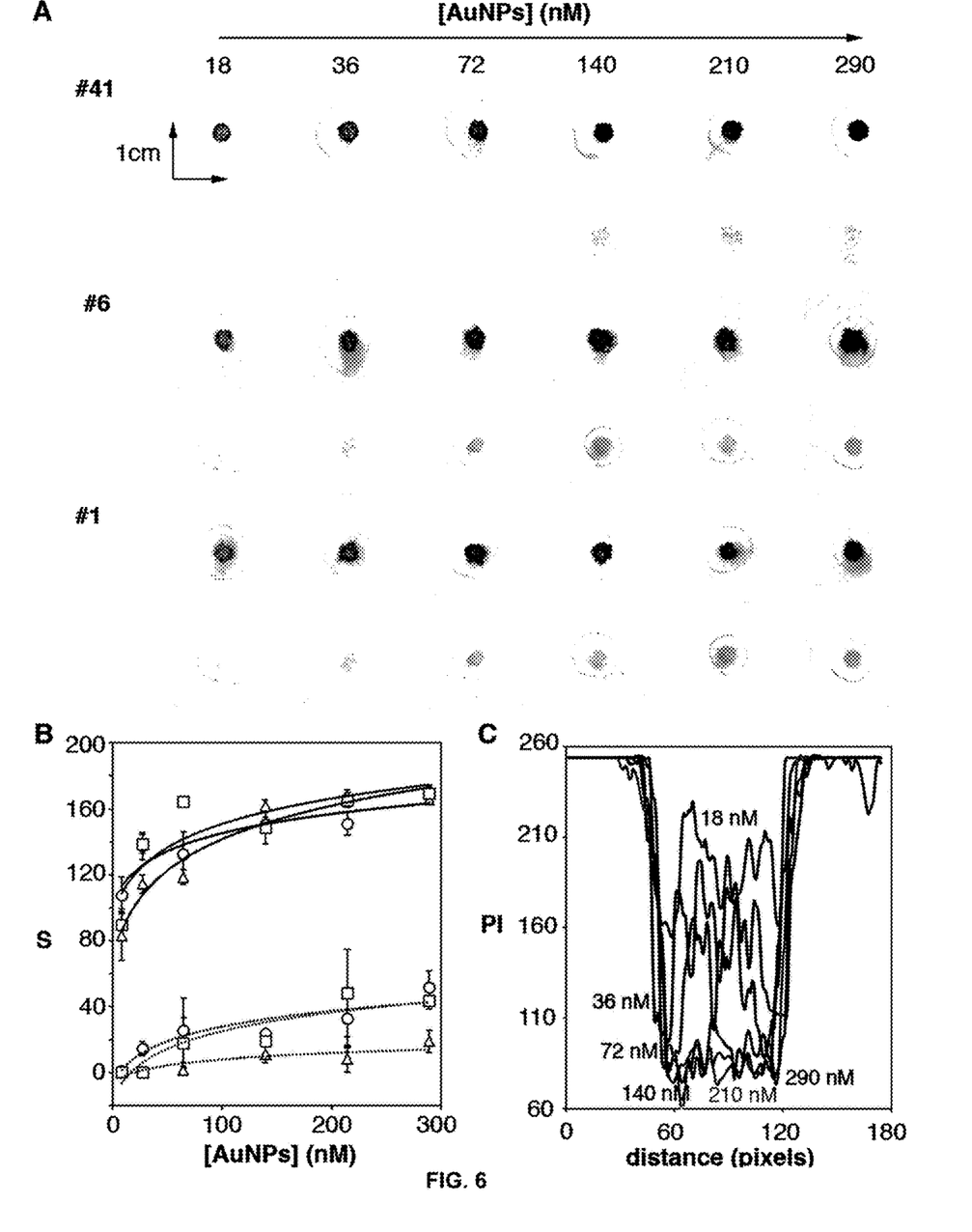
FIG. 6. Transfer of avidin-decorated nanoparticles stored at different concentrations to receiving paper substrates with different pore size (22, 11 and 3 µm for Whatman paper #41, #6 and #1, respectively) modified with biotinylated proteins; (A) Scanned images of the receiving substrates modified with biotinylated BSA (biotin) or unmodified BSA (control); (B) Colorimetric signals in receiving substrates made of Whatman paper #41 (triangles), #6 (circles), and #1 (squares); control experiments with non-biotinylated BSA are indicated with dotted lines; (C) Pixel intensity (PI) profiles across receiving substrates made of Whatman paper #41. Error bars are the standard deviation (n=3). Trend lines are a guide to the eye.

FIG. 6 shows the effect of the receiving paper pore size in the generation of colorimetric signals when the reservoirs are loaded with 30% PSS and different concentrations of avidin-grafted gold nanoparticles. Non-specific interactions were evaluated with non-biotinylated (BSA) (low row lanes in FIG. 6A). In FIG. 6B, densitometry shows that, while the 3 paper types generate similar colorimetric signals in biotinylated substrates, Whatman paper #6 and #1 resulted in higher non-specific interactions compared to Whatman paper #41. This is ascribed to the higher specific area of paper types #6 and #1 due to their smaller pore size (11 and 3 μm, respectively), which favors non-specific interactions between nanoparticles and the receiving substrate. In FIG. 6C the pixel intensity within the colorimetric signal is homogenously distributed (i.e. no ring formation) when the concentration of nanoparticles in the reservoir is 140 nM or higher in Whatman paper #41. These results, in addition to those obtained in FIG. 4, indicate that paper-based reservoirs containing 30% PSS and 140 nM nanoparticle probes are the best candidates to generate homogenous and highly intense plasmonic signals in biosensors.

Figure 7:
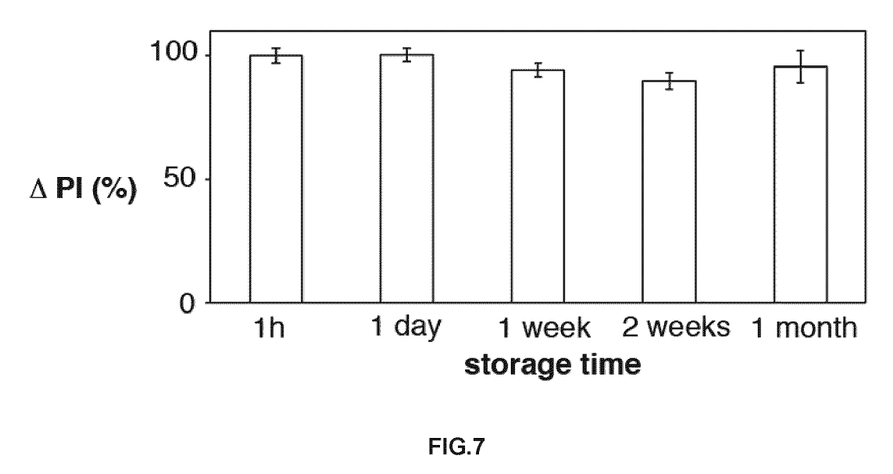
FIG. 7. Variation of the colorimetric signal (pixel intensity, PI) resulting from biospecific avidin-biotin interactions when the assay is performed using dry nanoparticle reservoirs stored for different times. The percentage signal was calculated with respect to the reservoirs stored for 1 h. Error bars are the standard deviation (n=3).

Besides being able to transfer biomolecule-modified nanoparticles, reservoirs containing biomolecular nanoprobes should be able to store them in dry conditions for extended periods of times. This is particularly important for incorporating the reservoirs in biosensors meant for in-field applications, since it is not always possible to store them in ideal conditions (i.e. low temperature, dry conditions). To test the shelf-life of the proposed reservoirs, paper substrates modified with 30% PSS and 140 nM avidin-modified gold nanoparticles were stored for up to one month. The reservoirs were kept in an envelope at room temperature. No preservatives were added, and no additional measures such as lyophilization or co-storage with silica gel were taken in order to further preserve the probes. Then experiments with biotinylated and non-biotinylated BSA were performed in order to evaluate the ability of the nanoparticles to establish biospecific interactions after being stored in the paper reservoirs for different times. FIG. 7 shows the % remaining colorimetric signal compared to reservoirs used within 1 h after being fabricated. In this Figure the signal never decreases below 85% of the original, which shows that the proposed method is useful for fabricating biosensors with extended shelf-life without the need to impose strict temperature or humidity storage conditions.

Figure 8:
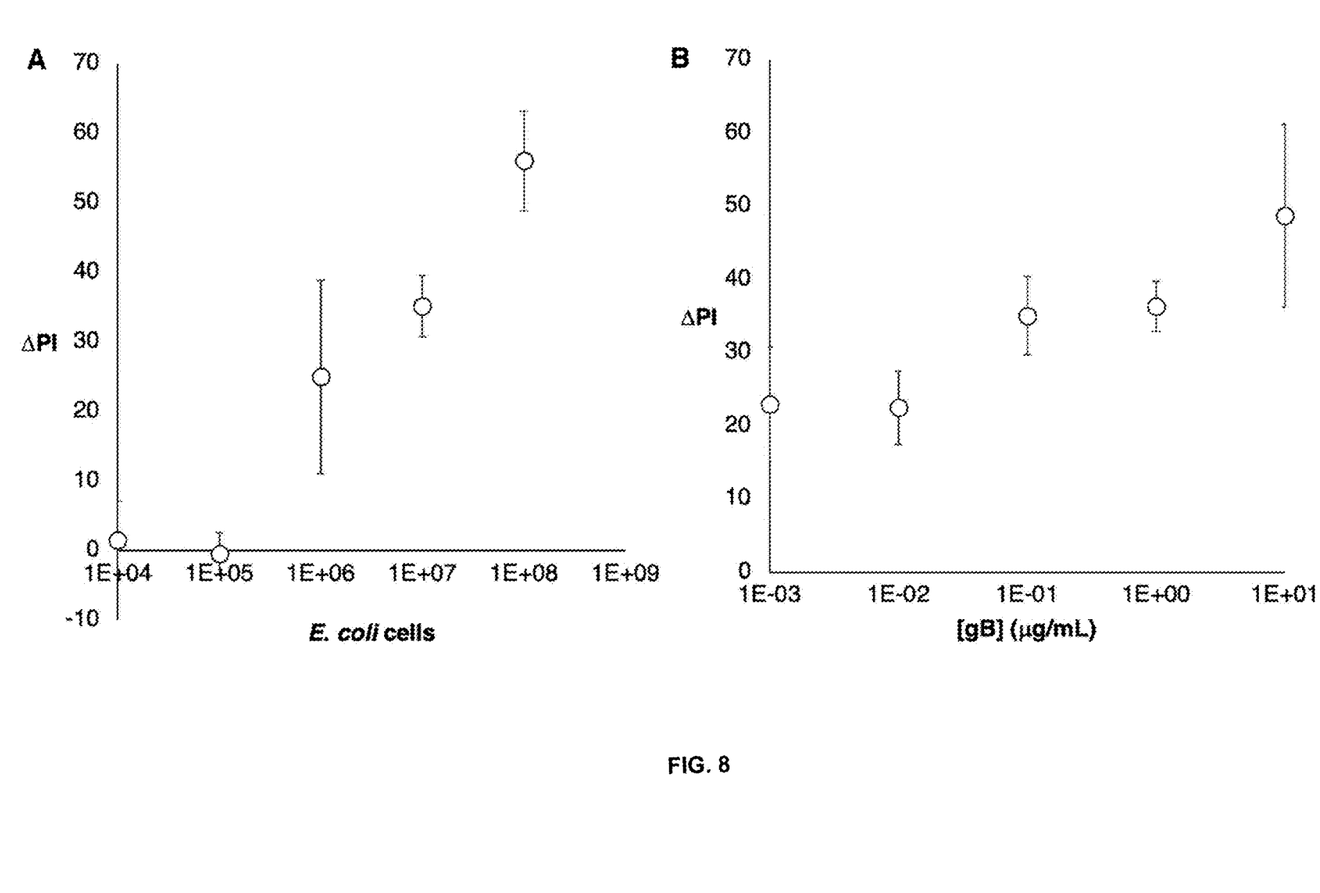
FIG. 8 Detection of *E. coli* (A) and glycoprotein B from cytomegalovirus (B) with antibody-decorated nanoparticles stored in paper reservoirs (semi-logarithmic scale). Error bars are the standard deviation (n=3).
Figure 9:
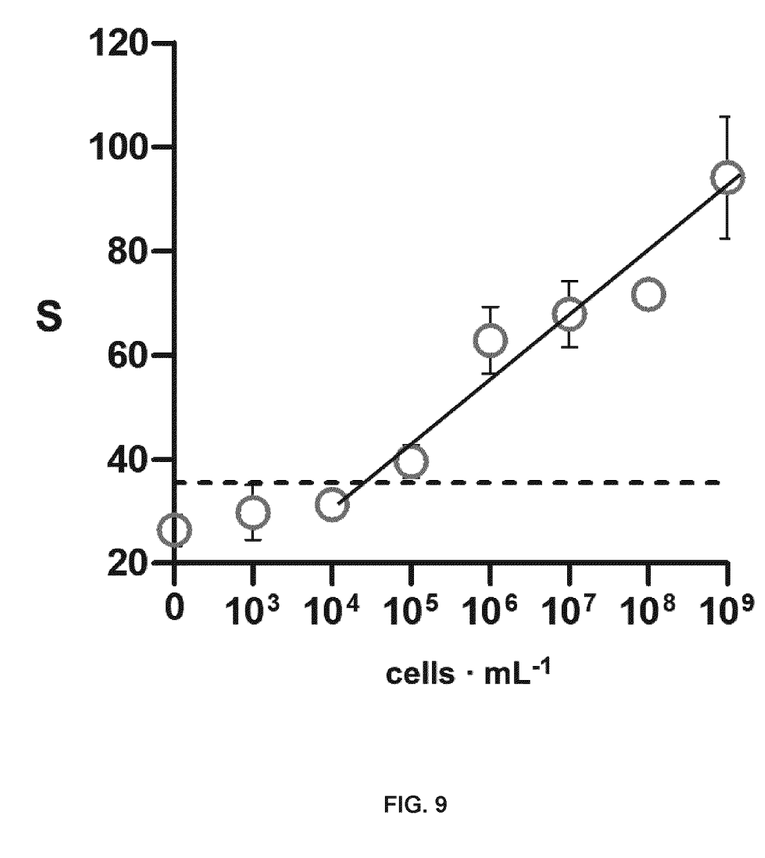
FIG. 9 Detection of *Pseudomonas aeruginosa* with antibody-recorated nanoparticles stored in paper reservoirs (semi-logarithmic scale). Error bars are the standard deviation. The colorimetric signal S is the integer obtained after subtracting pixel intensity of the background from the pixel intensity of the region of interest.
Figure 10:
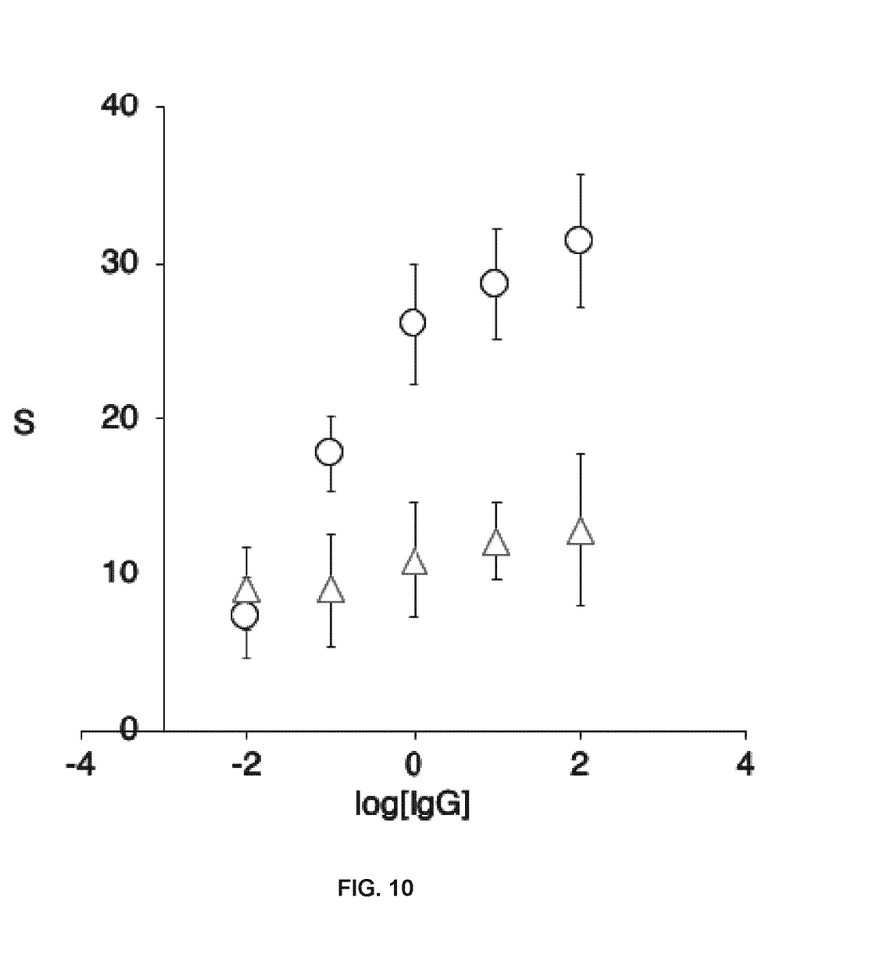
FIG. 10. Detection of rabbit IgG (dots) and BSA (triangles) in polypropylene face masks with nanoparticles decorated with anti-rabbit IgG stored in paper reservoirs. Error bars are the standard deviation. The colorimetric signal S is the integer obtained after subtracting pixel intensity of the background from the pixel intensity of the region of interest.

Finally, it has been proven that reservoirs containing nanoparticles modified with antibodies could be used to specifically detect antigens immobilized on paper substrates at different concentrations. To this end, the receiving paper substrate was modified with a drop of either *E. coli* or glycoprotein B and let dry. After blocking and adding PBST, reservoirs were placed on top and pressed against the receiving substrate for 5 min. After peeling off the reservoir and washing, the increase in pixel intensity was calculated. In FIG. 8, calibrations plots show the colorimetric signal increases as the concentration of antigen increases, which demonstrates that the proposed reservoirs can be used to store and release antibody-modified nanoparticles, and that the antibodies retain their biorecognition functions after being stored in the reservoir. Experiments for detecting *Pseudomonas aeruginosa* with the same procedure but using nanoparticles modified with antibodies against this pathogen were also performed. Results are shown in FIG. 9. Additional experiments were also performed in order to demonstrate that antibody-decorated nanoparticles can be transferred from paper reservoirs to substrates that are not made of paper. To this end, a model analyte (rabbit IgG) was sprayed on a clinical-grade face mask. Then the inner polypropylene layer was removed and the presence of rabbit IgG was detected with the same method used for detecting *E. coli, P. aeruginosa* and glycoprotein B but using reservoirs containing nanoparticles modified with anti-rabbit IgG. In FIG. 10, masks that were sprayed with rabbit IgG yield dose-dependent signals that are higher than those obtained in control experiments performed spraying BSA. These experiments demonstrate that antibody-decorated nanoparticles can be transferred to polypropylene face masks, where they are able to stablish specific antibody-antigen interactions.

The invention claimed is:

1. A process for obtaining a reservoir comprising protein-decorated nanoparticles on paper substrates, the process comprising:
    (i) treating a paper substrate with a hydrophilic negatively charged polymer over the paper substrate, wherein the polymer is polystyrene sulfonate (PSS); and
    (ii) applying protein-decorated nanoparticles over the paper substrate obtained in step (i); and
    (iii) releasing the nanoparticles from the reservoir.
2. The process according to claim 1, wherein the protein is a protein capable of establishing biological interactions.
3. The process according to claim 2, wherein the protein is avidin or an antibody.
4. The process according to claim 3, wherein the protein is an antibody.
5. The process according to claim 1, wherein the nanoparticles are pegylated nanoparticles.
6. The process according to claim 5, wherein the pegylated nanoparticles are pegylated nanoparticles made of gold.

7. The process according to claim 1, wherein the treating step (i) is performed by spotting the polymer over pieces of the paper substrate.

8. The process according to claim 1, wherein pieces of the paper substrate of step (i) are cut in the form of squares.

9. The process according to claim 1, wherein a volume of added polymer is large enough to create a volume of polymer-modified paper that is larger than a volume occupied by the nanoparticles.

10. The process according to claim 9, wherein the volume of added polymer is 50 μL and the volume of pegylated nanoparticles is 1 μL.

11. The process according to claim 1, which further comprises drying the paper substrate after step (i).

12. The process according to claim 11, wherein drying the paper substrate is performed at a temperature from 15° C. to 50° C.

13. The process according to claim 1, which further comprises comprising letting the paper substrate dry after step (ii).

14. The process according to claim 13, wherein letting the paper substrate dry is performed at a temperature from 15° C. to 25° C.

15. The process according to claim 1, wherein the releasing step (iii) is a transferring step to a receiving substrate.

16. The process according to claim 1, wherein the releasing step (iii) is a transferring step to a wet receiving paper substrate or to a polypropylene receiving substrate.

17. The process according to claim 15, wherein the transferring step (iii) is performed by pressing.

18. The process according to claim 17, wherein the transferring step (iii) is performed by pressing with a finger, a press or a clamp.

19. The process according to claim 15, wherein the transferring step (iii) is adjusted by fine-tuning the polymer content and the concentration of nanoparticles.

20. The process according to claim 1, further comprising a transferring step to a receiving substrate, wherein the protein bound to the nanoparticles establishes biological interactions with a target bound to the receiving substrate.

21. The process according to claim 20, wherein the protein is avidin or an antibody.

22. The process according to claim 20, wherein the target is biotin or antigens.

23. A reservoir comprising protein-decorated nanoparticles on paper substrates obtained by the process of claim 1.

* * * * *